United States Patent
Shoda et al.

(10) Patent No.: US 7,439,693 B2
(45) Date of Patent: Oct. 21, 2008

(54) ANOMALY DETECTION METHOD AND MOTOR CONTROL DEVICE

(75) Inventors: Kazuo Shoda, Tokyo (JP); Yuki Nomura, Tokyo (JP); Yoshifumi Nagato, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 11/631,005

(22) PCT Filed: Jun. 29, 2005

(86) PCT No.: PCT/JP2005/011970

§ 371 (c)(1),
(2), (4) Date: Dec. 28, 2006

(87) PCT Pub. No.: WO2006/001479

PCT Pub. Date: Jan. 5, 2006

(65) Prior Publication Data

US 2007/0188117 A1    Aug. 16, 2007

(30) Foreign Application Priority Data

Jun. 29, 2004    (JP)    ............ 2004-191809

(51) Int. Cl.
*H02K 41/00*    (2006.01)
(52) U.S. Cl. ........................ 318/135; 318/717; 318/560; 318/611
(58) Field of Classification Search ................ 318/135, 318/71, 560, 568.22, 611, 616, 650, 254, 318/138, 439, 715, 798, 802, 717
See application file for complete search history.

(56) References Cited

U.S. PATENT DOCUMENTS

| 4,663,576 | A | | 5/1987 | Scarola et al. |
| 6,016,607 | A | * | 1/2000 | Morimoto et al. ............ 33/1 M |
| 6,456,946 | B1 | | 9/2002 | O'Gorman |
| 2003/0222612 | A1 | | 12/2003 | Howard et al. |

FOREIGN PATENT DOCUMENTS

| JP | 9-62343 A | 3/1997 |
| JP | 2003-348900 A | 12/2003 |
| JP | 2004-100640 | 4/2004 |

OTHER PUBLICATIONS

International Search Report of PCT/JP2005/011970, date of mailing Oct. 11, 2005.
Translation of International Preliminary Report on Patentability dated Jan. 9, 2007of International Application No. PCT/JP2005/011970.
Office Action issued Mar. 21, 2008 in counterpart Chinese Application 200580021945X.

* cited by examiner

*Primary Examiner*—Karen Masih
(74) *Attorney, Agent, or Firm*—Westerman, Hattori, Daniels & Adrian, LLP.

(57) ABSTRACT

A control unit of a motor driver performs feedback control to supply current to a linear motor based on a detection value of a linear encoder. An anomaly detection unit monitors the supply current to the linear motor, and the anomaly detection unit detects anomaly of a linear motion apparatus based on a waveform of the supply current. In the case where the anomaly is detected, a user is notified of warning by means of a lamp, a buzzer, an e-mail, and the like. Therefore, the anomaly of the linear motion apparatus can be detected early and accurately.

7 Claims, 5 Drawing Sheets

(a)

(b)

(c)

ANOMALY DETECTION METHOD AND MOTOR CONTROL DEVICE

TECHNICAL FIELD

The present invention relates to a technology in which anomaly of a linear motion apparatus is detected on a motor control device side.

BACKGROUND ART

Conventionally, there is widely used a linear motion apparatus such as a linear guide and a ball screw. In this kind of linear motion apparatus, a linear motor or a servo motor is used to drive a movable body, and a position, speed, and acceleration of the movable body is controlled by changing a current supplied from a motor driver (motor control device).

When a foreign substance falls in a traveling path of the movable body, or when chips or dust invades into a ball circuit of the linear motion apparatus, the smooth movement of the movable body is interrupted, which causes a malfunction or a failure. Therefore, usually an overload alarm function is provided in the motor driver, and a warning is issued when the supply current exceeds a predetermined alarm value (threshold).

DISCLOSURE OF THE INVENTION

Problem to be Solved by the Invention

The supply current to the motor depends on drive conditions (such as speed, acceleration, load applied to the movable body) of the linear motion apparatus. Therefore, under normal circumstances, the alarm value should be set at an optimum value according to the drive conditions of the linear motion apparatus.

However, in a product shipment stage, because it is not known under what conditions a user uses the linear motion apparatus, it is necessary that the alarm value be set at an upper limit value (motor driver capacity) as a factory default value of the alarm value. Therefore, in some cases, there is a large difference between the actual supply current value and the alarm value, which results in a risk of not accurately detecting anomaly of the linear motion apparatus.

Furthermore, because there exists time-lag between generation of anomaly and overload to some extent, sometimes the anomaly in an initial stage cannot appropriately be discovered by the conventional overload alarm function. For example, even if an impact is intermittently applied to the movable body due to ball circuit failure or movable body catch, because only a steep spike-shape pulse emerges in the supply current, the overload is not generated and the alarm function does not work. Therefore, the linear motion apparatus is continuously driven without recognizing the anomaly, which sometimes leads to the failure or breakage of the linear motion apparatus or motor control device.

In view of the above-described conditions, the object of the invention is to provide a technology in which the anomaly of the linear motion apparatus can be detected early and accurately.

Means for Solving Problem

In order to achieve the object, in a linear motion apparatus anomaly detection method according to an aspect of the invention, anomaly of a linear motion apparatus is detected based on a waveform of supply current or supply voltage to a motor which drives the linear motion apparatus.

In the case where the linear motion apparatus is normally operated, the supply current or supply voltage to the motor exhibits a stable waveform (normal signal) having a frequency or amplitude according to control contents. On the other hand, in the case where some sort of anomaly is generated, disturbance is generated in the waveform. The invention focuses on this point.

The anomaly can be detected by a motor control device of the motor which drives a movable body of the linear motion apparatus. For example, the motor control device detects a position or a speed of the movable body by position detection means, and performs feedback control to the supply current or supply voltage to the motor based on the detection result. Then, the motor control device may detect anomaly of the linear motion apparatus based on an abnormal signal component included in a waveform of the supply current or the supply voltage.

In this case, while the movable body performs an expected motion, the stable waveform is outputted. However, when the movable body is shifted from an expected position or speed due to some sort of anomaly, the disturbance is generated in the waveform to correct the position or speed shift. The disturbance is treated as the abnormal signal component, and the abnormal signal component is utilized for the anomaly detection.

For details, the motor control device extracts the abnormal signal component which is superposed on a normal signal from the waveform of the supply current or supply voltage, and judges that the anomaly is generated in the linear motion apparatus when the abnormal signal component satisfies a predetermined condition. Examples of the condition include a threshold compared to amplitude of the abnormal signal component and a frequency in which the abnormal signal component emerges.

Anomaly detection means may be formed by either hardware or software. For example, the anomaly detection means may be composed of a hardware having a sensor that performs waveform input of said supply current or supply voltage; a filter circuit that extracts the abnormal signal component from the inputted waveform; and a comparison circuit that compares the extracted abnormal signal component and a predetermined condition. Therefore, high-speed processing can be realized.

Preferably warning output means is provided in the motor control device and the warning is outputted when the anomaly is detected.

Preferably warning transmission means is provided in the motor control device and the warning is transmitted to a user through an electric communication line when the anomaly is detected.

In addition to the anomaly notification, the motor speed may be reduced or the motor may be stopped by the control means when the anomaly is detected.

The invention can be seen as the motor control device having at least a part of the above means. The invention can also be seen as the actuator including the motor control device and the linear motion apparatus. The invention can also be seen as the linear motion apparatus anomaly detection method or the linear motion apparatus control method including at least a part of the above processes. The invention can be formed by combining the above means and processes as much as possible.

EFFECT OF THE INVENTION

According to the invention, the anomaly of the linear motion apparatus can be detected early and accurately. Such anomaly detection enables the warning notification or apparatus stoppage to be performed promptly, and preventing breakage or failure in the linear motion apparatus or motor control device.

BEST MODE FOR CARRYING OUT THE INVENTION

Then, a preferred embodiment of the invention will be described in detail by way of example with reference to the drawings.

FIG. 1 shows a configuration of an actuator according to an embodiment of the invention. An actuator 1 of the embodiment is a linear motor actuator in which the movable body is driven by a linear motor. The actuator 1 includes a linear motion apparatus 2 and a motor driver (motor control device) 3 which controls the linear motion apparatus 2.

The linear motion apparatus 2 substantially includes a base unit 20 and a slider (movable body) 21 which is provided slidably with respect to the base unit 20. In the embodiment, two linear guides 22 are adopted as the linear motion mechanism of the slider 21, two rails 22a are provided on both sides of the base unit 20, and two blocks 22b are attached to the back surface of the slider 21. A plurality of rolling elements (balls or rollers) are placed between the rail 22a and the block 22b, and the smooth linear motion is realized by rolling motion of the rolling element in moving the slider 21.

A linear motor 23 is adopted as means for driving the slider 21. A magnet plate 23a formed by a permanent magnet is provided in a bottom surface of the base unit 20, and a mover 23b is fixed to a lower portion of the slider 21. A magnetic force and polarity of the mover 23b are appropriately changed by the motor driver 3, which allows the position, speed, and acceleration to be controlled in the slider 21.

The position and speed of the slider 21 are detected by utilizing a linear encoder 24 which is of the position detection means. A linear scale 24a attached to the base unit 20 is read with a head 24b fixed to the slider 21. The detection result of the linear encoder 24 is inputted to the motor driver 3, and the detection result is used for the feedback control of the linear motor 23.

FIG. 2 is a block diagram showing a functional configuration of the motor driver 3. The motor driver 3 includes a control unit 30, an anomaly detection unit 31, a warning output unit 32, and a warning transmission unit 33.

In the control unit 30, frequency and amplitude modulations are performed to each current of U, V, and W phases according to the set control program, and three-phase alternating current is supplied to the linear motor 23. The linear motor 23 is operated according to the supply current, and thereby the slider 21 is moved. Pieces of information on the position and speed of the slider 21 are detected by the linear encoder 24 and sequentially inputted to the control unit 30. Based on the detection result, the control unit 30 performs the feedback control of the supply current to the linear motor 23 to cause the slider 21 to execute an expected motion.

The anomaly detection unit 31 is anomaly detection means for monitoring the supply current to the linear motor 23 to detect the anomaly of the linear motion apparatus 2 based on the waveform of the supply current. In the embodiment, as shown in FIG. 3, the anomaly detection unit 31 is comprised of hardware including a current sensor 34, a filter circuit 35, and a comparison circuit 36. The current sensor 34 is a circuit to which the waveform of the supply current is inputted from a current supply line. The filter circuit 35 is a circuit that extracts the abnormal signal component from the input waveform. The comparison circuit 36 is a circuit that compares the abnormal signal component inputted from the filter circuit 35 and a previously set condition.

The warning output unit 32 is the warning output means for outputting the warning when the anomaly of the linear motion apparatus 2 is detected. Examples of a warning output mode includes warning lamp lighting, buzzer sound, and speech sound output.

The warning transmission unit 33 is the warning transmission means for transmitting the warning to a user through LAN (Local Area Network) or the Internet when the anomaly of the linear motion apparatus 2 is detected. In this case, the warning transmission unit 33 has a mail client function, and the warning transmission unit 33 is made to send an electronic mail to a previously registered mail address. The destination of the electronic mail may include a personal computer and a portable telephone.

In the above configuration, when the linear motion apparatus 2 is normally operated, namely, when the slider 21 executes the motion at an expected position, speed, or acceleration, the current supplied from the control unit 30 exhibits the stable waveform as shown in FIG. 4(a). On the other hand, when the anomaly is generated in the linear motion apparatus 2 to shift the slider 21 from the expected position, the control works to correct the positional shift, and thereby the disturbance is generated in the waveform. For example, a steep spike-shape pulse emerges as shown in FIG. 4(b) in the case where an impact is intermittently applied to the slider 21, and the waveform is disrupted temporarily as shown in FIG. 4(c) in the case where the slider 21 collides with an obstacle.

Such disturbance of the waveform emerges in an initial stage of the anomaly. However, because the supply current does not become overloaded at that time, the overload alarm function does not work. Therefore, in the embodiment, the waveform disturbance is treated as the abnormal signal component, and the waveform disturbance is utilized for the anomaly detection.

FIG. 5 shows an example of the anomaly detection process in the anomaly detection unit 31.

The waveform of the supply current is inputted by the current sensor 34 to the anomaly detection unit 31. In this case, as shown in FIG. 5(a), it is assumed that the waveform including the spike-shape pulse is inputted.

The filter circuit 35 performs a filtering process to the input waveform in order to extract only the abnormal signal component. In the embodiment, the input waveform is a composite waveform in which the high-frequency component (normal signal) is superposed on the two kinds of the frequency components outputted according to the control program (FIG. 5(b)). It is thought that the high-frequency component is a signal component generated by the anomaly (disturbance) of the slider 21. Therefore, the high-frequency component can be extracted as the abnormal signal component (FIG. 5(c)).

The comparison circuit 36 compares the amplitude of the abnormal signal component and the condition (threshold). When the abnormal signal component reaches the threshold, a signal corresponding to "presence of anomaly" (hereinafter referred to as "anomaly detection signal") is outputted to at least one of the control unit 30, the warning output unit 32, and the warning transmission unit 33. In other cases except for the presence of anomaly, the signal corresponding to "absence of anomaly" is outputted or no signal is outputted.

When the control unit 30 receives the anomaly detection signal from the anomaly detection unit 31, the control unit 30 interrupts the running control, and the control unit 30 reduces the speed of the linear motor 23 or stops the linear motor 23 in order to prevent the failure or breakage of the instrument. The warning output unit 32 outputs the warning to notify an operator near by of the generation of the anomaly, and prompts a rapid action. Further, the warning transmission unit 33 automatically sends the electronic mail to a remote technical staff or manufacturer support, and the electronic mail is utilized to verify the anomaly point or to judge whether or not maintenance is required.

According to the aforementioned configuration of the embodiment, anomaly of the linear motion apparatus, which is hardly detectable by the conventional overload alarm function, can be detected early and accurately.

When the anomaly is detected, a user is promptly notified of the warning or the apparatus is promptly stopped. Therefore, the failure or breakage can be prevented in the linear motion apparatus or the motor driver.

The embodiment of the invention is merely described by way of example. The invention is not limited to the embodiment, but various modifications could be made without departing from the technical idea of the invention.

In the embodiment, the anomaly detection unit is formed by the hardware. Alternatively, the same configuration maybe formed by software. In the hardware configuration, the processing speed is enhanced, which results in an advantage that rapidness of the anomaly detection is improved. On the other hand, in the software configuration, there is an advantage that contents of the anomaly detection process can be changed and improved by exchanging the programs.

In the example shown in FIG. 5, the high-frequency component is extracted through the filtering process. However, the abnormal signal component detection method is not limited to the example shown in FIG. 5. Examples of the abnormal signal component detection method include a method of performing frequency analysis of the waveform of the supply current to detect the abnormal signal component (waveform disturbance), a method in which the normal waveform is assumed from contents of the control program and the abnormal signal component is detected by comparison of the assumed waveform and the actual input waveform, and a method of comparing the several-period-old input waveform and the current input waveform to detect the generation of the abnormal signal component.

In the embodiment, the linear guide is adopted as the linear motion mechanism. In addition, the ball screw, a roller screw, a ball spline, and a combination thereof can preferably be adopted as the linear motion mechanism.

A rotary servo motor may be adopted as the linear motion mechanism drive means in place of the linear motor, and a rotary encoder may be adopted as the slider position detection means in place of the linear encoder.

In the embodiment, the waveform of the supply current is monitored. However, in the case where the motor is voltage-controlled, it is preferable that the waveform of the supply voltage is monitored to detect the anomaly.

In the embodiment, the warning output unit and the warning transmission unit are incorporated into the motor driver. Alternatively, it is preferable that the functions of the warning output unit and the warning transmission unit are realized by an external device connected to the motor driver. For example, the motor driver and the personal computer are connected with RS-232C or USB, and the warning is outputted from the personal computer or the warning electronic mail is transmitted from the personal computer based on the anomaly detection signal outputted from the motor driver. In this case, the motor driver and the external device constitute the motor control device of the invention.

The above-described contents include the following technical ideas.

(First Mode)
A linear motion apparatus anomaly detection method of detecting anomaly of a linear motion apparatus based on a waveform of supply current or supply voltage to a motor which drives the linear motion apparatus.

(Second Mode)
A linear motion apparatus anomaly detection method, wherein a motor control device of a motor which drives a movable body of a linear motion apparatus, executes the steps of: detecting a position or a speed of the movable body; performing feedback control to supply current or supply voltage to the motor based on the detection result; and detecting anomaly of the linear motion apparatus based on an abnormal signal component included in a waveform of the supply current or the supply voltage.

(Third Mode)
A linear motion apparatus anomaly detection method according to second mode, wherein the motor control device further executes the steps of: extracting the abnormal signal component which is superposed on a normal signal from the waveform of the supply current or supply voltage; and judging that the anomaly is generated in the linear motion apparatus when the abnormal signal component satisfies a predetermined condition.

(Fourth Mode)
A linear motion apparatus anomaly detection method according to a second or third mode for outputting the warning when the anomaly is detected.

(Fifth Mode)
A linear motion apparatus anomaly detection method according to the second to fourth modes for transmitting the warning to a user through an electric communication line when the anomaly is detected.

(Sixth Mode)
A linear motion apparatus anomaly detection method according to the second to fifth modes wherein the speed of the motor is reduced or the motor is stopped when the anomaly is detected.

(Seventh Mode)
A motor control device that controls a motor for driving a movable body of a linear motion apparatus, the motor control device comprising: position detection means for detecting a position or a speed of the movable body; control means for performing feedback control to supply current or supply voltage to the motor based on the result detected by the position detection means; and anomaly detection means for detecting anomaly of the linear motion apparatus based on an abnormal signal component included in a waveform of the supply current or supply voltage.

(Eighth Mode)
A motor control device according to the seventh mode wherein the anomaly detection means extracts the abnormal signal component which is superposed on a normal signal from the waveform of the supply current or supply voltage, and judges that the anomaly is generated in the linear motion apparatus when the abnormal signal component satisfies a predetermined condition.

(Ninth Mode)
A motor control device according to the eighth mode wherein the anomaly detection means includes a sensor that performs waveform input of the supply current or supply voltage; a filter circuit that extracts the abnormal signal component from the inputted waveform; and a comparison circuit that compares the extracted abnormal signal component and a predetermined condition.

(Tenth Mode)

A motor control device according to the seventh to ninth modes further comprising warning output means for outputting the warning when the anomaly is detected.

(Eleventh Mode)

A motor control device according to the seventh to tenth modes further comprising warning transmission means for transmitting the warning to a user through an electric communication line when the anomaly is detected.

(Twelfth Mode)

A motor control device according to the seventh to eleventh modes wherein the control means reduces the speed of the motor or stops the motor when the anomaly is detected.

(Thirteenth Mode)

An actuator comprising a linear motion apparatus and a motor control device, the linear motion apparatus having a movable body driven by a motor, the motor control device controlling the motor, the motor control device including position detection means for detecting a position or a speed of the movable body; control means for performing feedback control to supply current or supply voltage to the motor based on the result detected by the position detection means; and anomaly detection means for detecting anomaly of the linear motion apparatus based on an abnormal signal component included in a waveform of the supply current or supply voltage.

(Fourteenth Mode)

An actuator according to the thirteenth mode wherein the anomaly detection means extracts the abnormal signal component which is superposed on a normal signal from the waveform of the supply current or supply voltage, and judges that the anomaly is generated in the linear motion apparatus when the abnormal signal component satisfies a predetermined condition.

(Fifteenth Mode)

An actuator according to the fourteenth mode wherein the anomaly detection means includes a sensor that performs waveform input of the supply current or supply voltage; a filter circuit that extracts the abnormal signal component from the inputted waveform; and a comparison circuit that compares the extracted abnormal signal component and a predetermined condition.

(Sixteenth Mode)

An actuator according to the thirteenth to fifteenth modes further comprising the warning output means for outputting the warning when the anomaly is detected.

(Seventeenth Mode)

An actuator according to the thirteenth to sixteenth modes further comprising the warning transmission means for transmitting the warning to a user through an electric communication line when the anomaly is detected.

(Eighteenth Mode)

An actuator according to the thirteenth to seventeenth modes wherein the control means reduces the speed of the motor or stops the motor when the anomaly is detected.

EXPLANATIONS OF LETTERS AND NUMERALS

Figure 1:
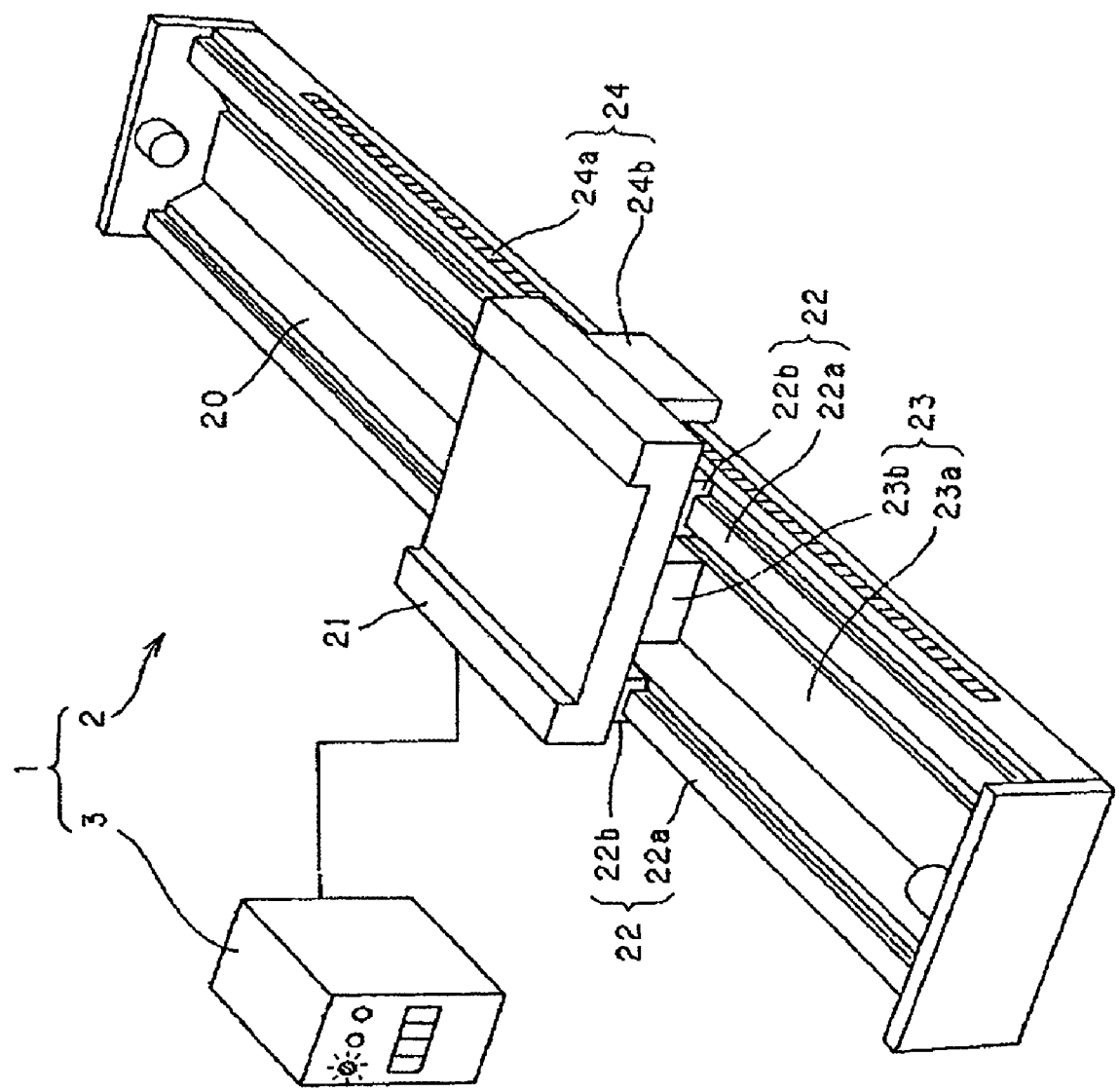
FIG. 1 is a view showing a configuration of an actuator according to an embodiment of the invention.
Figure 2:
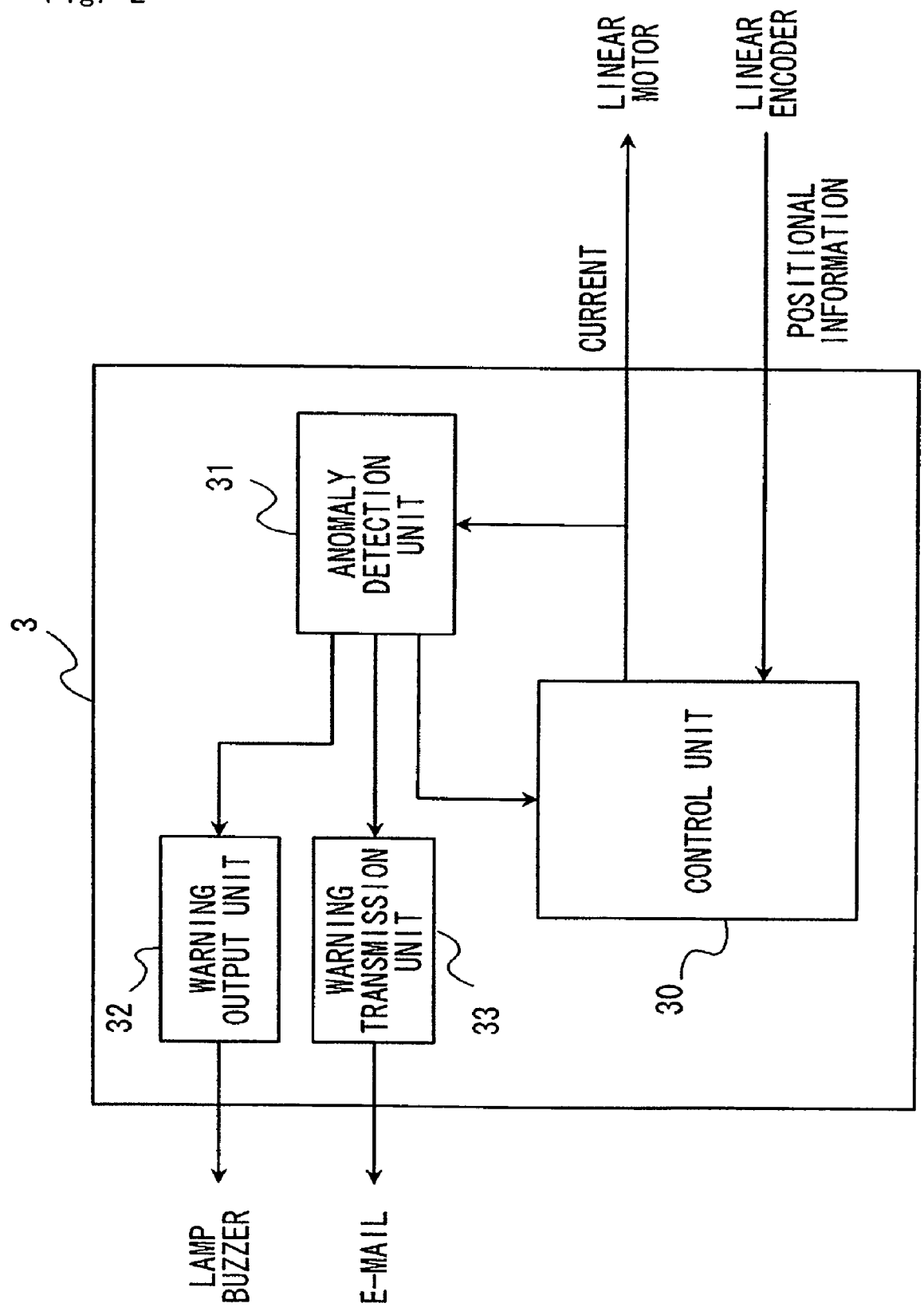
FIG. 2 is a block diagram showing a functional configuration of a motor driver.
Figure 3:
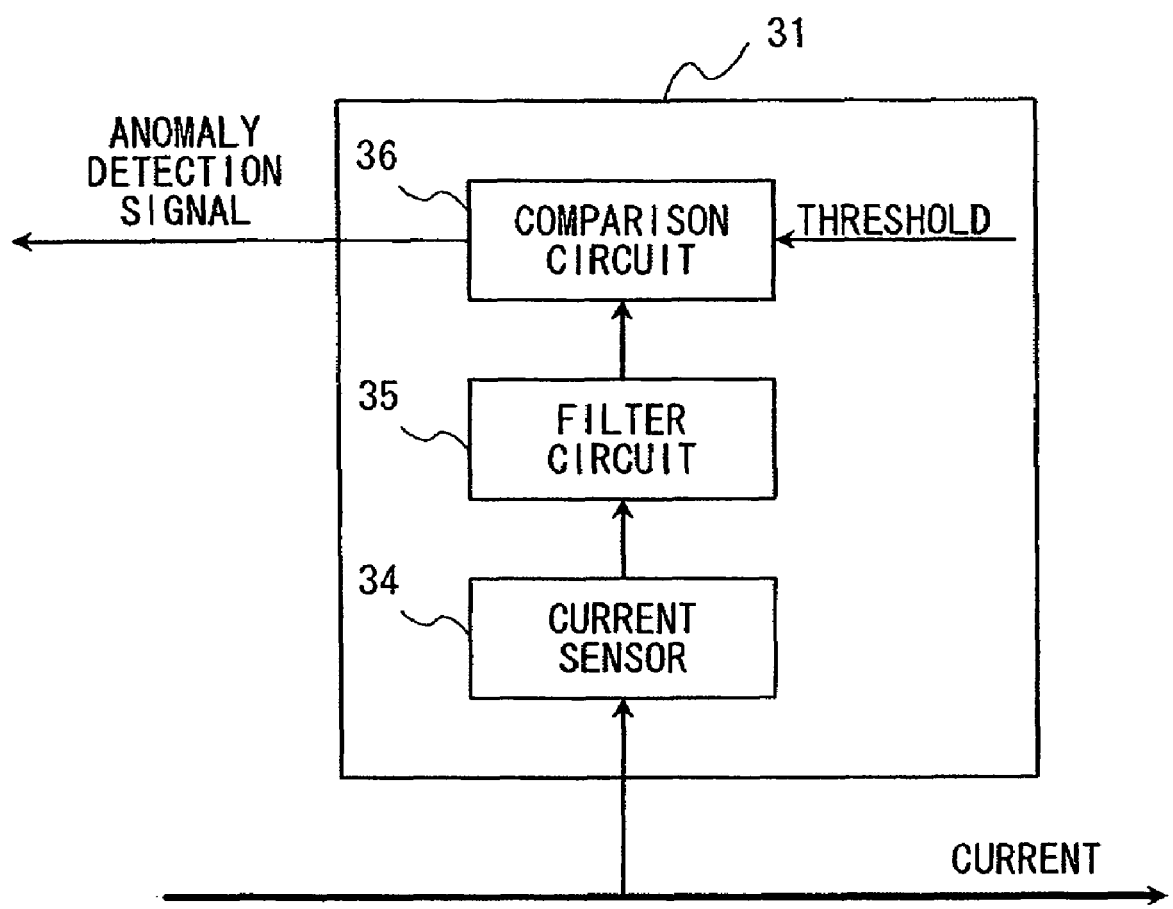
FIG. 3 is a block diagram showing a hardware configuration of an anomaly detection unit.
Figure 4:
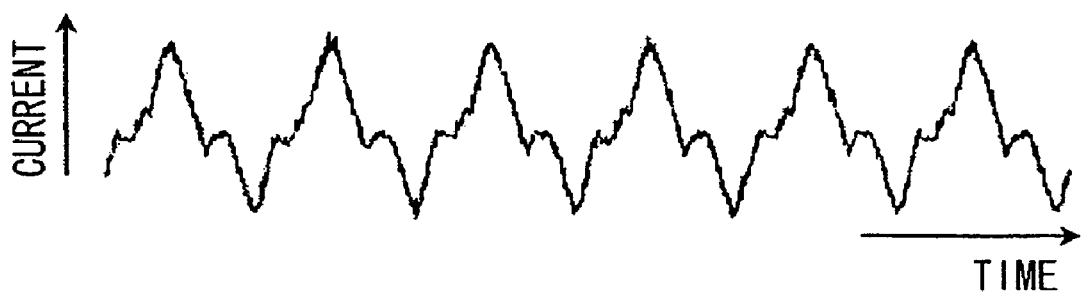
FIG. 4 is a view showing an example of a supply current waveform.
Figure 4:
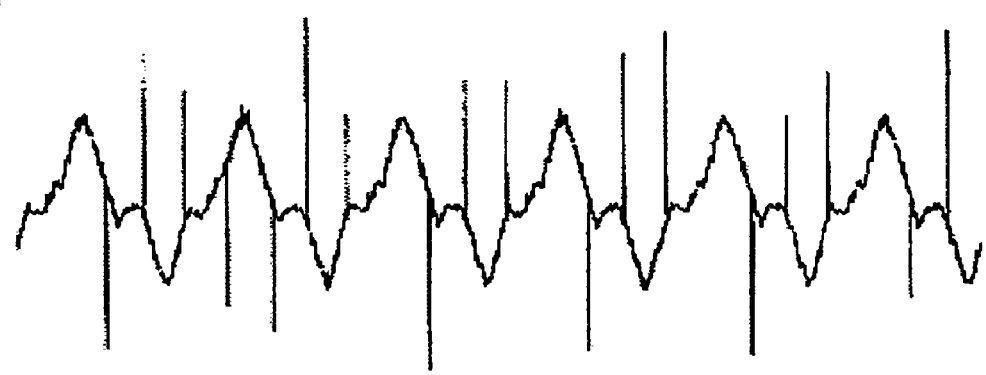
Figure 4:
Figure 5:
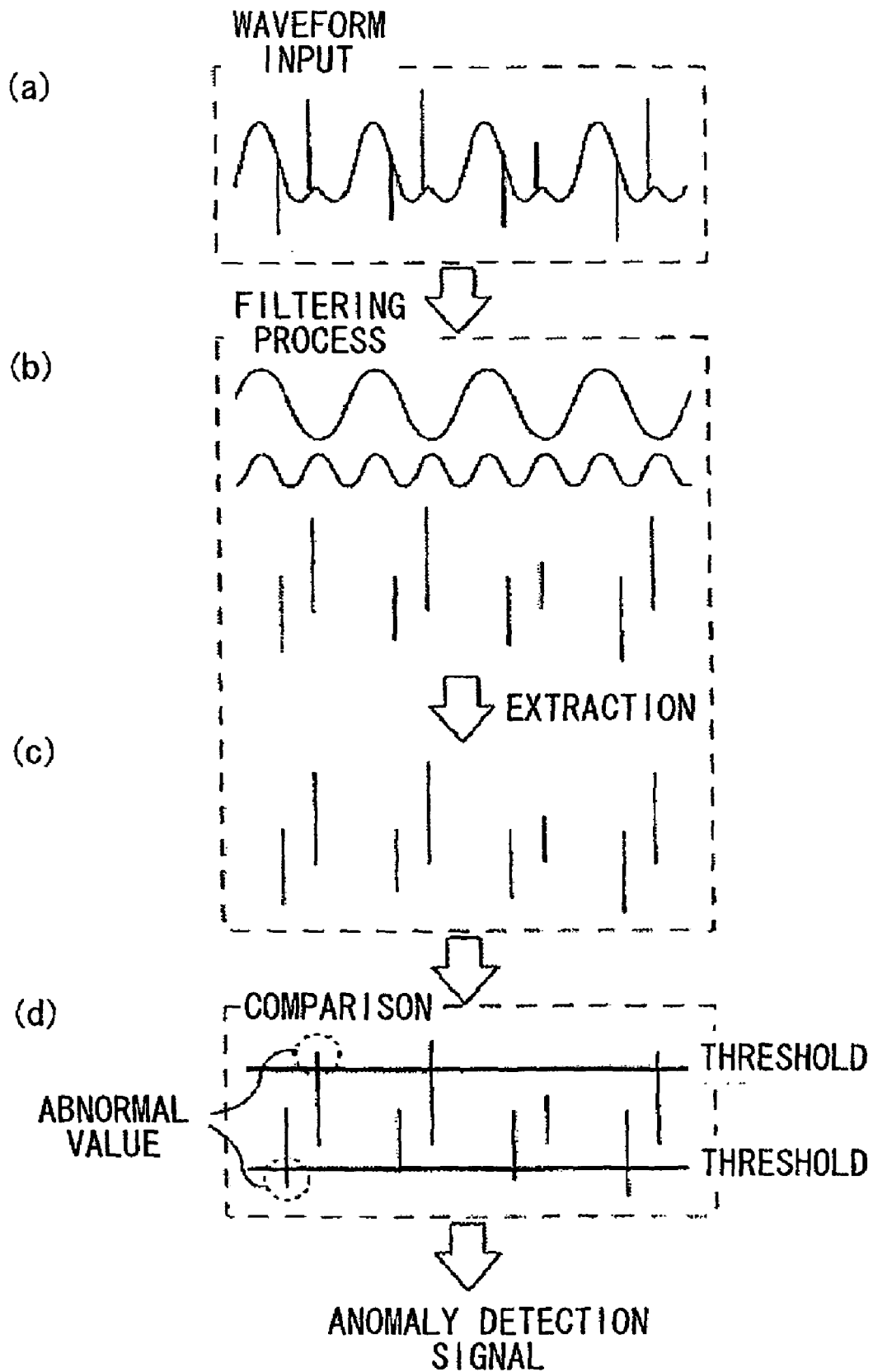
FIG. 5 is a view for explaining an anomaly detection process.

1 Actuator
2 Linear motion apparatus
3 Motor driver (motor control device)
20 Base unit
21 Slider (movable body)
22 Linear guide
23 Linear motor
24 Linear encoder
30 Control unit
31 Anomaly detection unit
32 Warning output unit
33 Warning transmission unit
34 Current sensor
35 Filter circuit
36 Comparison circuit

The invention claimed is:

1. A linear motion apparatus anomaly detection method, wherein a motor control device of a motor which drives a movable body of a linear motion apparatus, executes the steps of:
   detecting a position or a speed of the movable body;
   performing feedback control to supply current or supply voltage to the motor based on the detection result; and
   detecting an anomaly of the linear motion apparatus based on an abnormal signal component included in a waveform of the supply current or the supply voltage.

2. A linear motion apparatus anomaly detection method according to claim 1, wherein the motor control device further executes the steps of:
   extracting the abnormal signal component which is superposed on a normal signal from the waveform of the supply current or supply voltage; and
   judging that the anomaly is generated in the linear motion apparatus when the abnormal signal component satisfies a predetermined condition.

3. A motor control device that controls a motor for driving a movable body of a linear motion apparatus, the motor control device comprising:
   position detection means for detecting a position or a speed of the movable body;
   control means for performing feedback control to supply current or supply voltage to the motor based on the result detected by the position detection means;
   anomaly detection means for detecting an anomaly of the linear motion apparatus based on an abnormal signal component included in a waveform of the supply current or supply voltage.

4. A motor control device according to claim 3, wherein the anomaly detection means includes:
   a sensor that performs waveform input of the supply current or supply voltage;
   a filter circuit that extracts the abnormal signal component from the inputted waveform; and
   a comparison circuit that compares the extracted abnormal signal component and a predetermined condition.

5. A linear motion apparatus anomaly detection method according to claim 2, wherein the extracted abnormal signal component is a high-frequency component of the waveform of the supply current or supply voltage.

6. A motor control device according to claim 3, further comprising extracting means for extracting the abnormal signal component which is superposed on a normal signal from the waveform of the supply current or supply voltage, wherein the anomaly detection means detects the anomaly in the linear motion apparatus when the abnormal signal component satisfies a predetermined condition.

7. A motor control device according to claim 4, wherein the filter circuit extracts a high-frequency component of the wave form of the supply current or supply voltage as the abnormal signal component.

* * * * *